United States Patent
Ahola

(10) Patent No.: US 9,088,493 B2
(45) Date of Patent: *Jul. 21, 2015

(54) METHOD AND APPARATUS FOR TIME ADAPTATION OF ONLINE SERVICES TO USER BEHAVIOR

(71) Applicant: NOKIA CORPORATION, Espoo (FI)

(72) Inventor: Tom Mikael Ahola, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/198,267

(22) Filed: Mar. 5, 2014

(65) Prior Publication Data

US 2014/0189111 A1 Jul. 3, 2014

Related U.S. Application Data

(63) Continuation of application No. 12/560,465, filed on Sep. 16, 2009, now Pat. No. 8,706,821.

(51) Int. Cl.
*H04L 12/26* (2006.01)
*H04L 29/08* (2006.01)

(52) U.S. Cl.
CPC ...... *H04L 43/0876* (2013.01); *H04L 29/08972* (2013.01); *H04L 67/22* (2013.01); *H04L 67/325* (2013.01)

(58) Field of Classification Search
CPC .............. H04L 29/08945–29/08972; H04L 29/08801–29/00837
USPC ................... 709/206–207, 223–224
See application file for complete search history.

(56) References Cited

U.S. PATENT DOCUMENTS

| | | |
|---|---|---|
| 5,893,077 A | 4/1999 | Griffin |
| 6,025,844 A | 2/2000 | Parsons |
| 6,055,510 A | 4/2000 | Henrick et al. |
| 6,618,716 B1 | 9/2003 | Horvitz |
| 6,742,033 B1 | 5/2004 | Smith et al. |
| 6,993,559 B2 | 1/2006 | Jilk, Jr. et al. |
| 7,035,923 B1 | 4/2006 | Yoakum et al. |
| 7,139,797 B1 | 11/2006 | Yoakum et al. |
| 7,152,018 B2 | 12/2006 | Wicks |
| 7,305,437 B2 | 12/2007 | Horvitz et al. |
| 7,529,683 B2 | 5/2009 | Horvitz et al. |
| 7,574,661 B2 | 8/2009 | Matsuura et al. |
| 2002/0133404 A1 | 9/2002 | Pedersen |
| 2003/0001880 A1 | 1/2003 | Holtz et al. |
| 2003/0084171 A1 | 5/2003 | De Jong et al. |
| 2004/0139426 A1 | 7/2004 | Wu |
| 2005/0245245 A1 | 11/2005 | Sorvari et al. |
| 2008/0065762 A1* | 3/2008 | Nauerz et al. ............. 709/224 |
| 2008/0077672 A1 | 3/2008 | Knight |
| 2009/0006176 A1* | 1/2009 | Handley ................. 705/10 |
| 2009/0210806 A1 | 8/2009 | Dodson et al. |

OTHER PUBLICATIONS

"Message." Merriam-Webster.com Merriam-Webster, 2012. Web. Jun. 6, 2012.

* cited by examiner

*Primary Examiner* — Brendan Higa
(74) *Attorney, Agent, or Firm* — Ditthavong & Steiner, P.C.

(57) ABSTRACT

An approach is provided for time adaption of online services. Timing information relating to usage by a user of one or more online services is retrieved. A pattern of consistent usage is determined from the timing information. Scheduling information is generated for transmission of a message based on the determined pattern.

8 Claims, 9 Drawing Sheets

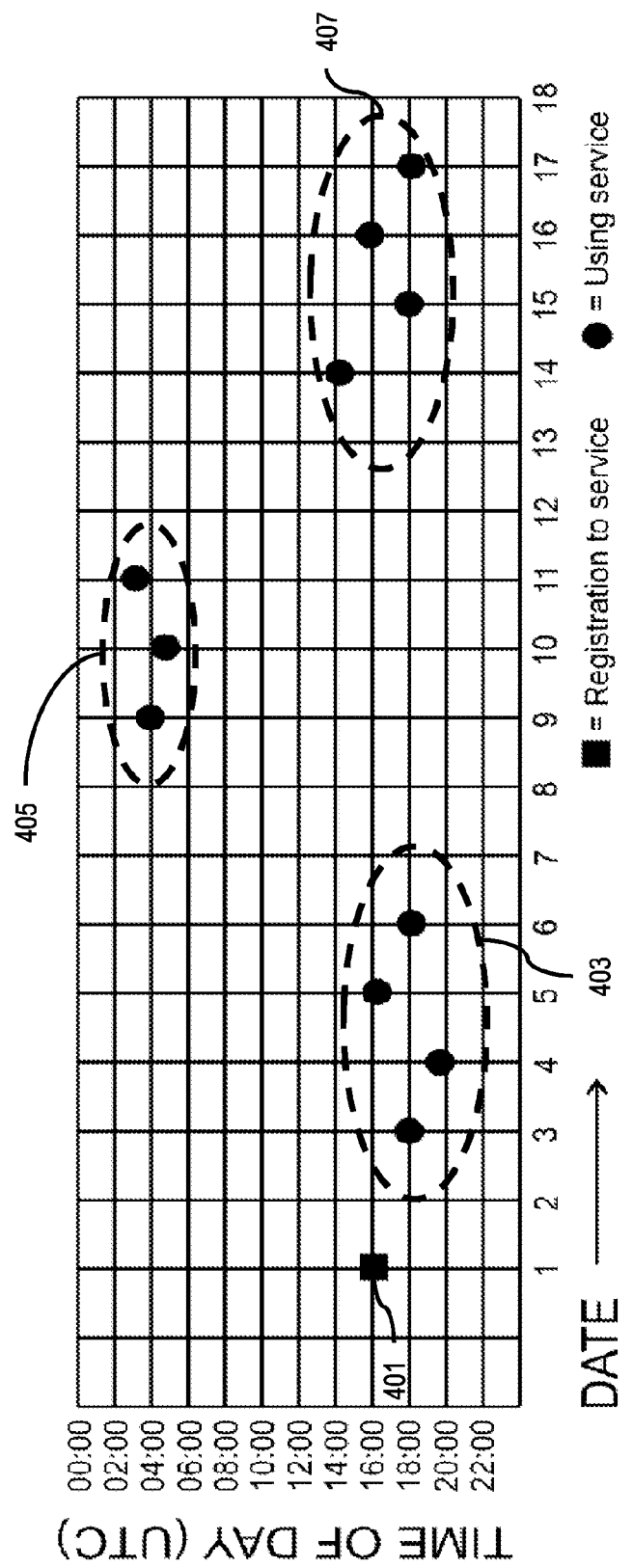

METHOD AND APPARATUS FOR TIME ADAPTATION OF ONLINE SERVICES TO USER BEHAVIOR

CROSS-REFERENCE TO RELATED APPLICATIONS

This application is a continuation of U.S. application Ser. No. 12/560,465, filed Sep. 16, 2009, the entirety of which is incorporated herein.

BACKGROUND

Service providers (e.g., wireless, cellular, etc.) and device manufacturers are continually challenged to deliver value and convenience to consumers by, for example, providing compelling online network services. Online services have gained widespread use among consumers across a variety of industries. As the sophistication of online services increase, so too have telecommunications services, which offer a range of messaging services and applications, beyond that of traditional voice services. Such messaging services, for example, include short message service (SMS) and multimedia message service (MMS). Given the rapid development of both online services and telecommunication services, the integration of these services has thus been slow and superficial.

SOME EXAMPLE EMBODIMENTS

According to one embodiment, a method comprises retrieving timing information relating to usage by a user of one or more online services. The method also comprises determining a pattern of consistent usage from the timing information. The method further comprises generating scheduling information for transmission of a message based on the determined pattern.

According to another embodiment, an apparatus comprising at least one processor, and at least one memory including computer program code, the at least one memory and the computer program code configured to, with the at least one processor, cause the apparatus to retrieve timing information relating to usage by a user of one or more online services. The apparatus is also caused to determine a pattern of consistent usage from the timing information. The apparatus is further caused to generate scheduling information for transmission of a message based on the determined pattern.

According to another embodiment, a computer-readable storage medium carrying one or more sequences of one or more instructions which, when executed by one or more processors, cause an apparatus to retrieve timing information relating to usage by a user of one or more online services. The apparatus is also caused to determine a pattern of consistent usage from the timing information. The apparatus is further caused to generate scheduling information for transmission of a message based on the determined pattern.

According to another embodiment, an apparatus comprises means for retrieving timing information relating to usage by a user of one or more online services. The apparatus also comprises means for determining a pattern of consistent usage from the timing information. The apparatus further comprises means for generating scheduling information for transmission of a message based on the determined pattern.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4 is a graph displaying an exemplary representation of timing information for use in determining an appropriate schedule for message delivery, according to one embodiment;

DESCRIPTION OF SOME EMBODIMENTS

A method, apparatus, and software for determining appropriate times for delivery of messages to a user based on the user's pattern of usage of an online service are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
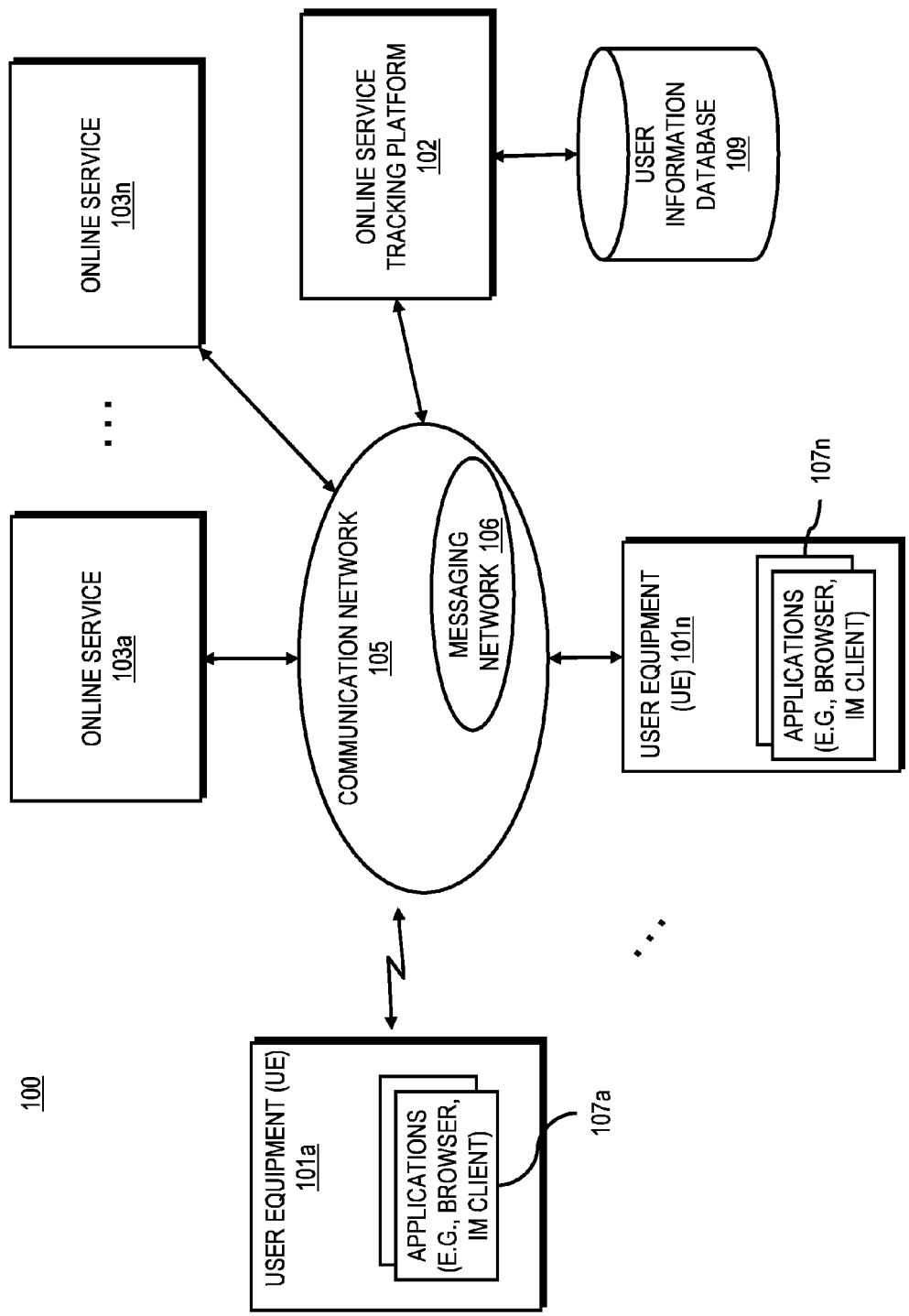
FIG. 1 is a diagram of a system capable of determining a schedule based on online services usage for delivery of messages to users, according to one embodiment.

FIG. 1 is a diagram of a system 100 capable of determining a schedule based on online services usage for delivery of messages users, according to one embodiment. As mentioned, online services have emerged as a key vehicle for commerce. According to certain embodiments, the term "online services" refers to a website or other internet-based service (e.g., a streaming music service) that permits users to obtain a product or service. For example, the user can register for and subscribe to an online service such as a shopping website, a social networking service, or another service.

The online service may find it beneficial to send a message to the user to convey an advertisement, a survey, or other information. When sending messages by an online service to a user, sending messages at the appropriate time of day would be more effective; that is, when the user is receptive to such information.

A system 100 of FIG. 1 utilizes an online service tracking platform 102 to determine appropriate times to send messages to users of one or more online services 103. The appropriateness of the schedule or time, according to one embodiment, can be based on whether the schedule is consistent with the user's use of the online services. A schedule is consistent with the user's use of the online service, in some embodiments, if collected information about the user's usage is free from variation to a certain degree for a certain time window. During the scheduled appropriate time, the user is more likely to be amenable to receiving messages relating to the particular online services. By contrast, if the online service sends a message (e.g., text message) to a user late at night, the user may not available, and thus, the message is ineffective. Moreover, the message may even cause the user to be awoken by a text message alert, if the user is asleep. Consequently, the user may be inclined to have a negative impression of the online service, as the user is unaccustomed to using online services late at night and was asleep. This can lead to the user becoming reluctant to use the online service again.

Under another scenario, the text message may instead be transmitted to another user during the same period (i.e., late night), but this user is awake and utilizing the online service or another online service, such user would be more agreeable to viewing the message. Additionally, because online services can be global, factors such as the time zone, the lifestyle of an individual user, etc, may need to be taken into account by the online service when determining an appropriate schedule for delivery of the messages to users. Moreover, an individual user is more likely to react to messages at certain times a day depending on the individual user's time zone and lifestyle. For example, the user may be more likely to respond to a survey questionnaire while the user is utilizing a service associated with the questionnaire than when performing another activity.

As shown, the online services 103 in conjunction with the online service tracking platform 102 can communicate with user equipment 101 over a communication network 105, which supports a messaging network 106 for delivery of messages to the UEs 101a-101n. The messaging network 106 can provide, according to certain embodiments, such services as email, instant messaging (IM), a short message service (SMS) message (i.e., text message), multimedia message service (MMS), or other real-time communication.

A user may use a web browser 107a or a dedicated client application 107n (e.g., an instant messaging client) to utilize online service 103. Examples of "online services" may include a shopping service, a music service, a messaging service (e.g., an instant messaging service, an e-mail service, a text messaging service, etc.), a social networking service, a product warranty service, an online gaming service, and/or other services available online. It is contemplated that the approach described herein may be used with other online services 103. The system 100 allows for a user information database 109 to store timing information relating to usage of online services 103a-103n; such timing information can include time-stamps pertaining to login duration, transaction time, etc. The timing information can be collected by an online service tracking platform 102, which can receive timing information from various sources, including the online services 103. The collected timing information can be analyzed for consistency and then processed to determine an appropriate and/or effective time to send a message to individual users.

Under one scenario, a user can register for a particular type of online service 103a (e.g., a music service). The online service 103a may transmit the timing information to the online service tracking platform 102, which can save timing information associated with the user registration in a user information database 109. Next, as the user utilizes the online service 103a, the online service 103a can send additional timing information about the activities of the user to the online service tracking platform 102. For example, the online service 103a can send timing information associated with a login of the user to the online service 103 to the online service tracking platform 102 to store at the user information database 109. Such timing information can include a login and logout time of the user's access, a login time and a duration of the user's access, a login time, a date of the user login, a type (e.g., weekend, weekday, holiday etc.) of day of the user's login, or another appropriate measure of the user's use of the online service 103. Additionally, the user may register and access another online service 103n. The online service tracking platform 102 can receive timing information from the other online service 103n and may update the user information database 109. The online service tracking platform 102 can reconcile the online service registrations based on a user name, a common e-mail address, a common phone number, or other common identifiers. Identifiers associated with timing information can indicate which service is associated with the time value. Accordingly, the online service tracking platform 102 can have access to the time the user spends online using the online service 103a as well as other online services 103.

Further, the online service tracking platform 102 can determine an appropriate time to send a message (e.g., an instant message) to the user's UE 101 based on the collected timing information. A pattern of usage can be used to determine the appropriate time to send the message. The pattern can be determined based on a set of pattern rules, where the time to send the message is appropriate if the rule is fulfilled. One such rule can include a pattern is created if on two consecutive days, the user uses the online service 103 within a three hour time window. Another rule could be that a pattern is created if on two consecutive "like days," the user uses the online service 103 within a four hour time window. A "like day" may be a criterion for the grouping of days that may contain separate patterns from other days (e.g., weekdays and weekends). Further, like day patterns can be determined using additional grouping pattern rules. A like day pattern rule can include a rule that if two or more patterns based on another pattern rule are found to repeat, the patterns can be separated into like groups. For example, the user can use the service at one time period for four days of the week and at another time period for the other three days of the week for multiple weeks. The online service tracking platform 102 can segregate these time periods based on a like day grouping pattern rule.

The online service tracking platform 102 can additionally determine if the timing information is consistent according to a consistency rule before utilizing the timing information for the determination. In certain embodiments, consistency rules can be based on the amount of variation in timing information over a certain period of time. For example, the user can have a usage pattern associated with the online service 103 that indicates that the user uses the online service 103 between 16:00 Coordinated Universal Time (UTC) and 18:00 UTC on weekdays, however, in the past two weekdays; the pattern has shifted to the user accessing the online service 103 between 2:00 UTC and 4:00 UTC. Because the pattern has shifted from one use time period pattern to another use time period pattern, the information may be inconsistent. Under one scenario, the consistency rule requires that a time period pattern must be consistent for at least three consecutive uses and the time period pattern must encompass less than a 4 hour time period. The current pattern meets the 4 hour time period portion of the rule, however fails the three consecutive uses portion of the rule. Thus, the online service tracking platform 102 may choose to postpone scheduling of the sending of the instant message until more data is collected. Alternatively, the consistency rule can require that a time period pattern must be consistent for at least two consecutive uses and the time period pattern must encompass less than a 3 hour time period. Under this scenario, the user's usage patterns meet the consistency rule and the message can be sent at the appropriate time.

As shown in FIG. 1, the system 100 comprises a user equipment (UE) 101 having connectivity to a online service 103 via a communication network 105. By way of example, the communication network 105 of system 100 includes one or more networks such as a data network (not shown), a wireless network (not shown), a telephony network (not shown), a messaging network 106 or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

As noted, the messaging network 106 can provide for a SMS messaging or MMS messaging capabilities. The messaging network 106 may be a part of a telephony network (e.g., a cellular network). As part of a cellular network, UE 101 can communicate with a cellular tower (not shown) to send and receive data including SMS messaging and MMS messaging. Cellular towers communicate with a UE 101 via control channels so that the UE 101 is able to ascertain which tower to connect to. A control channel can also be utilized to deliver messages. A message can be sent to a UE 101 via a cellular tower and a message service center (MSC) (not shown). The MSC can be used as a medium between the cellular network and internet protocol networks designed to carry messaging traffic. The message can have information about the message and the destination such as the length of the message, a time stamp, the destination phone number, etc., which can be used to route the message to the destination. In one example, an online service 103 or an online service tracking platform 102 can send a message to the UE 101 via the messaging network by sending the message to the MSC via an internet protocol network. Then, the MSC can deliver the message to the UE 101 via the cellular tower control channel.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UE 101, the online service 103, and the online service tracking platform 102 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Under one scenario, the system 100 may include a user information database 109. The user information database 109 can be accessed by the online service tracking platform 102. The user information database 109 can store information (e.g., registration information, timing information, etc.) associated with one or more users of one or more online services 103. More particularly, the user information database 109 can store timing information associated with the one or more users of the one or more services. Under some embodiments, the term "timing information" refers to any information associated with user usage of an online service 103 that is indicative of some tendency of the user. The timing information can include data points of time values such as a timestamp of when the registration was initiated and/or completed, a timestamp when the user logs in and/or logs out or is logged out due to inactivity, a timestamp and duration of how long the user was active, etc. Further, the timing information in the user information database 109 can include additional information associated with categorical information associated with data points of time values such as a day of the week of the observed user activity, whether user activity was observed on a weekday, whether the user activity was observed on a weekend, whether the user activity was observed on a recognized holiday, or the like. It is contemplated that the approach described herein may be used with other timing information not mentioned in the preceding examples. Additionally, it is contemplated that the user information database 109 can be a component of the online service tracking platform 102. Additionally, older or stale timing information associated with a user can be purged from the database once a certain quantity of newer timing information is gathered regarding the user.

Figure 2:
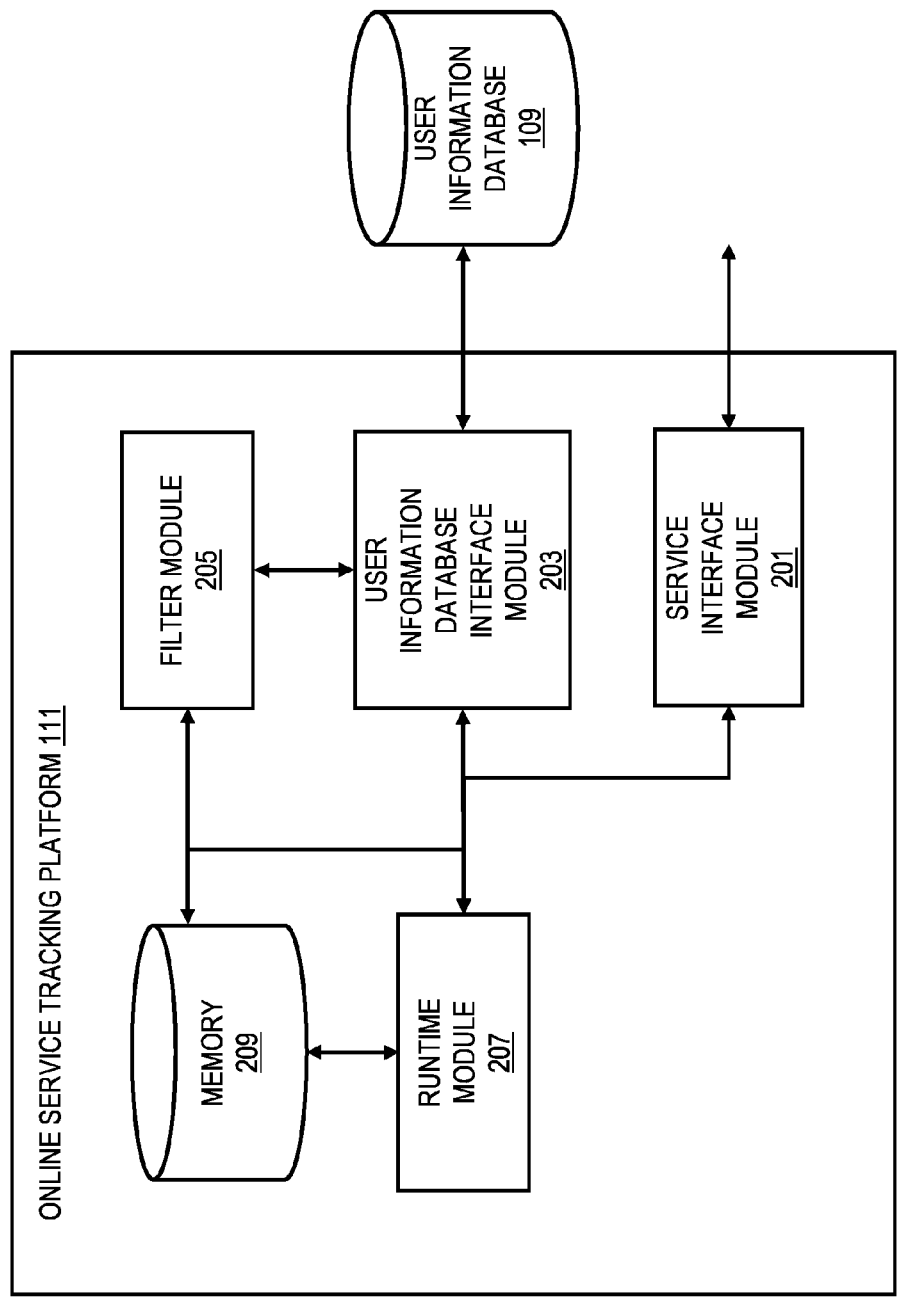
FIG. 2 is a diagram of the components of an online service tracking platform utilized in the system of FIG. 1, according to one embodiment.

FIG. 2 is a diagram of the components of an online service tracking platform 102 utilized in the system of FIG. 1, according to one embodiment. By way of example, the online service tracking platform 102 includes one or more components for determining a schedule (e.g., appropriate time periods) for sending messages to a user. It is contemplated that the functions of these components may be combined in one or more components or performed by other components of equivalent functionality. Additionally, it is contemplated that an online service 103 can implement the functions of the online service tracking platform 102. In this embodiment, the online service tracking platform 102 includes a service interface module 201, a user information database interface module 203, a filter module 205, a runtime module 207, and memory 209.

In one embodiment, the runtime module 207 executes the online service (e.g., a music store service or a social networking service). In this embodiment, the online service tracking platform 102 is also a platform for the online service 103. The runtime module 207 can allow a user, via a UE 101, to register for the online service by communicating via a service interface module 201. The service interface module 201 can communicate with the UE 101 and online services 103 via the communication network 105. Additionally, the service interface module 201 can be used to authenticate a user with the online service 103. The runtime module 207 can create login information associated with the user and store the login information in a user information database 109 via a user information database interface module 203. The user information database interface module 203 can communicate with the user information database 109 via the communication network 105 or via another communication means (e.g., a direct fibre channel connection or another data communication network). The runtime module 207 can also store timing information in the user information database 109 regarding the registration of the user. Further, once registration is complete, the runtime module 207 can allow the user access to the online service 103 once the user authenticates with the online service 103 via the service interface module 201. While the user is using the online service 103, the runtime module 207 can store timing information about the user's access in the user information database 109 via the user information database interface module 203.

In another embodiment, the runtime module 207 receives timing information collected by one or more online service 103 and stores the timing information in the user information database 109. The online service 103 may collect the timing information from users accessing the online service 103 and initiate transfer of the timing information to the online service tracking platform 102. The runtime module 207 receives the collected timing information via the service interface module 201 and stores the timing information in the user information database 109.

Additionally, the runtime module 207 may receive a request from the online service 103 to schedule a message to be sent to a user via the service interface module 201. Under one scenario, the online service 103 may determine that there is a need to send a message to a user. Thus, the online service 103 can request that the runtime module 207 determine an appropriate time to send the message to the user. A filter module 205 can be utilized to help determine the appropriate time to send the message to the user. The filter module 205 can have access to user timing information from the user information database 109 via the user information database interface module 203. According to one embodiment, the timing information can include data points of time values. Additionally, data regarding the individual user can be stored in memory 209 of the online service tracking platform 102 while the filter module 205 is executing.

The filter module 205 can include a median filter and/or another filter that removes irregular data points based on some criteria. In one example, the filter module 205 can filter the data points by determining a normal distribution and filtering via any data points outside of a normal distribution threshold. An example of a normal distribution threshold is a standard deviation or a multiple of a standard deviation. Additional or alternate statistical filtering mechanisms can be used as well. Additionally, the filter module 205 can segregate groups of data points based on additional filtering rules, such as segregating groups based on weekdays and weekends or based on usage patterns of an individual user. Once the data is filtered, the filtered timing information can be stored in the memory 209 for use by the runtime module 207 to determine an appropriate time to schedule sending of the message and/or send the message. In one embodiment, the runtime module 207 can initiate sending of the schedule to the online service 103, which can initiate sending of the message to the user. In another exemplary embodiment, the runtime module 207 initiates transmission of the message to the user.

Figure 3A:
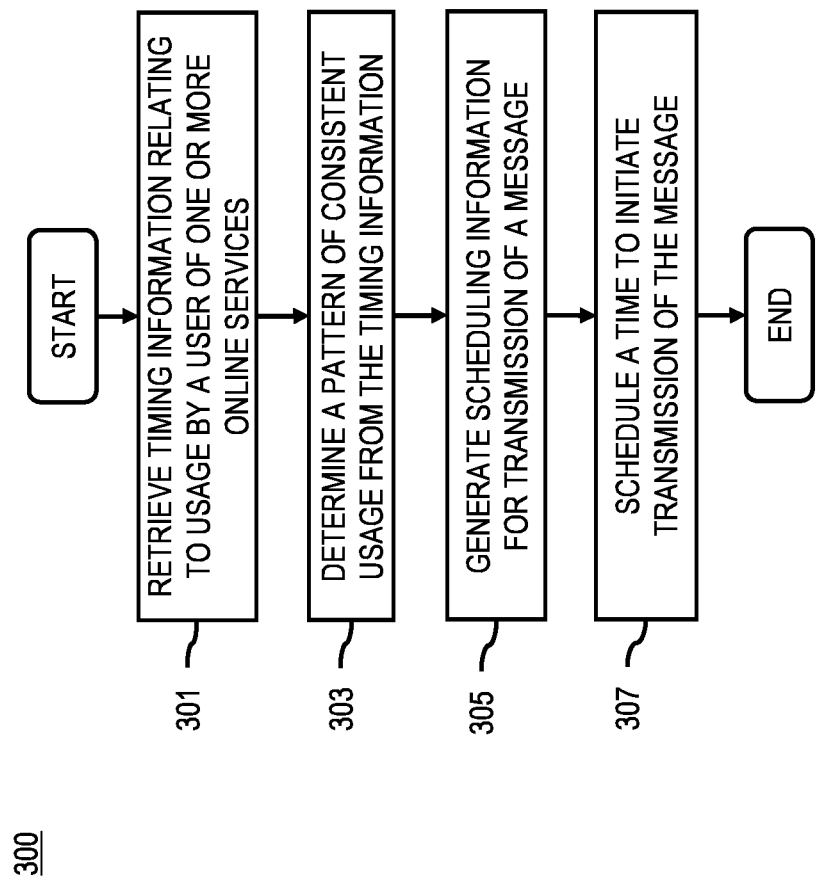
FIGS. 3A-3C are flowcharts of processes for collecting timing information and determining appropriate times to send messages to users of an online service, according to various embodiments.

FIG. 3A is a flowchart of a process 300 for determining an appropriate time to send messages to users of an online service 103, according to one embodiment. In one embodiment, the runtime module 207 performs the process 300 and is implemented in, for instance, a chip set including a processor and a memory as shown FIG. 6 and/or using a computer system of FIG. 5. The online service 103 can determine that it would be beneficial to send a message (e.g., an instant message or a text message) to the user of the online service 103 and request that the runtime module 207 determine an appropriate time to send the message. The message could include an advertisement, a promotion, a notification, a survey, a message conveying information about a product, a message conveying an advisory or warning, or the like. The runtime module 207 can receive the request from the online service 103 that is associated with the user to send a message to the user at an appropriate time. The runtime module 207 then begins a process of determining the appropriate time to send the message to the user.

In step 301, timing information relating to usage by the user of one or more online services 103 is retrieved from a user information database 109. The user information database 109 can include information from many users using online services 103. The runtime module 207 can select the user information to retrieve. Under one scenario, the runtime module 207 can select to retrieve user information of the user's use of any online services 103 collected in the user information database 109. This can provide the runtime module 207 a broad amount of information regarding the usage patterns of the user. For example, this information may allow an online service 103 to send messages to the user based on a pattern of when the user is using a service of a competitor. In another scenario, the runtime module 207 can select to retrieve user information of the user's use of the online service 103 that desires to send the message. This information is more directed towards the online service 103 and thus provides a more targeted time to send the message individualized to the online service 103.

Next, at step 303, the runtime module 207 determines a pattern of consistent usage of online services 103 by the user from the timing information. As described earlier, the timing information can include data points of time values. The runtime module 207 can filter the data points according to one or more criteria. As previously discussed, such criteria can include filtering the data points by determining a normal distribution and filtering out any data points outside of a normal distribution threshold. Then, the runtime module 207 determines one or more patterns associated with the data points that can help determine an appropriate time to send the message to the user. The pattern of consistent usage reflects use by the user based on certain rules. The rules can be based on the recentness of the data points, the consistency of the data points, or other criteria that reflect when a user is using the online service 103. For example, the determined pattern can be based on the number of times the user uses an online service 103 during a certain time window on multiple consecutive days.

Then, at step 305, the runtime module 207 generates scheduling information for transmission of the message based on the determined pattern from step 303. The determined pattern can include one or more sub-patterns, group patterns, other patterns, etc. The scheduling information can also be determined based on other factors such as the consistency of the pattern. Generating of scheduling information can be based on criteria. For example, generating scheduling information may be based on a set of criteria that requires that the determined pattern be consistent for at least a certain period of time. Thus, if a pattern is not consistent for the requisite time, the runtime module 207 can determine to postpone sending of the message until more consistent data is collected. Another criterion could be that if there is more than one available pattern, to select whichever pattern yields the soonest transmission time or select whichever pattern has the highest consistency level.

At step 307, the runtime module 207 schedules a time to initiate transmission of the message corresponding to the scheduling information. The scheduling information can be yield times or time periods for which the runtime module 207 should attempt to initiate transmission of the message. Then, the runtime module 207 initiates transmission of the message based on the scheduled time to a UE 101 of the user. Alternatively, the runtime module 207 can initiate transmission of the scheduling information to the online service.

Figure 3B:
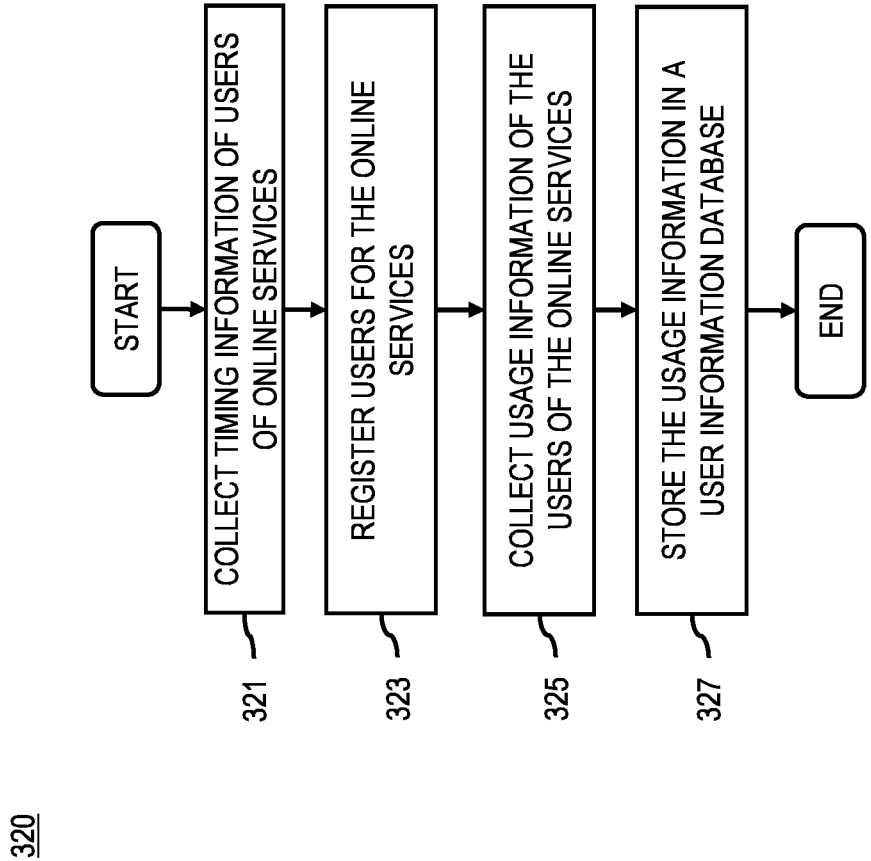

FIG. 3B is a flowchart of a process 320 for collecting timing information of a user of a service, according to one embodiment. In one embodiment, the runtime module 207 performs the process 320 and is implemented in, for instance, a chip set including a processor and a memory as shown FIG. 6 and/or using a computer system of FIG. 5. In one embodiment, the runtime module 207 can belong to an online service tracking platform 102 that is configured to provide one or more online services. At step 321, the runtime module 207 collects timing information relating to usage of the one or more online services 103 from one or more users. To initiate collecting of the information, the runtime module 207 can, at step 323, register the user for the one or more online services 103. Thus, when the user logs into the online services 103, timing information can be collected by the runtime module 207 and stored in the user information database 109.

Then, at step 325, the runtime module 207 collects usage information of the users of the online services 103, according to one embodiment. The timing information can be collected by the runtime module 207 from an online service tracking platform 102 configured to provide the one or more online services 103. In this embodiment, the runtime module 207 collects timing information via the online service 103 while a user is using the online service 103 and stores the timing information in the user information database 109. Alternatively, the online service 103 can be on another platform collecting timing information at the platform. The other platform can collect the timing information from user usage and can send the information to the online service tracking platform 102 to store the timing information in the user information database 109. The timing information can then be retrieved by the by the runtime module 207. Additionally, the timing information can refer to any information associated with user usage of an online service 103. The timing information can be indicative of some tendency of the user. Under one scenario, the timing information is associated with a login of the user with one of the one or more online services 103. The timing information can include data points of time values such as a timestamp of when the registration was initiated and/or completed, a timestamp when the user logs in and/or logs out or is logged out due to inactivity, or a timestamp and duration of how long the user was active. Moreover, the timing information in the user information database 109 can include additional information associated with categorical information associated with data points of time values. The categorical information can include a day of the week of the observed user activity, whether user activity was observed on a weekday, whether the user activity was observed on a weekend, whether the user activity was observed on a recognized holiday, or other categorical information.

In one embodiment, at step 327, the runtime module 207 stores the timing information of the users in the user information database 109. Timing information of multiple users can be stored in the user information database 109. The timing information from more than one online service 103 can be utilized to determine when the user is utilizing the user's UE 101. Additionally, timing information from a particular online service 103 can provide more specific information as to when the user is using the particular online service 103.

Figure 3C:
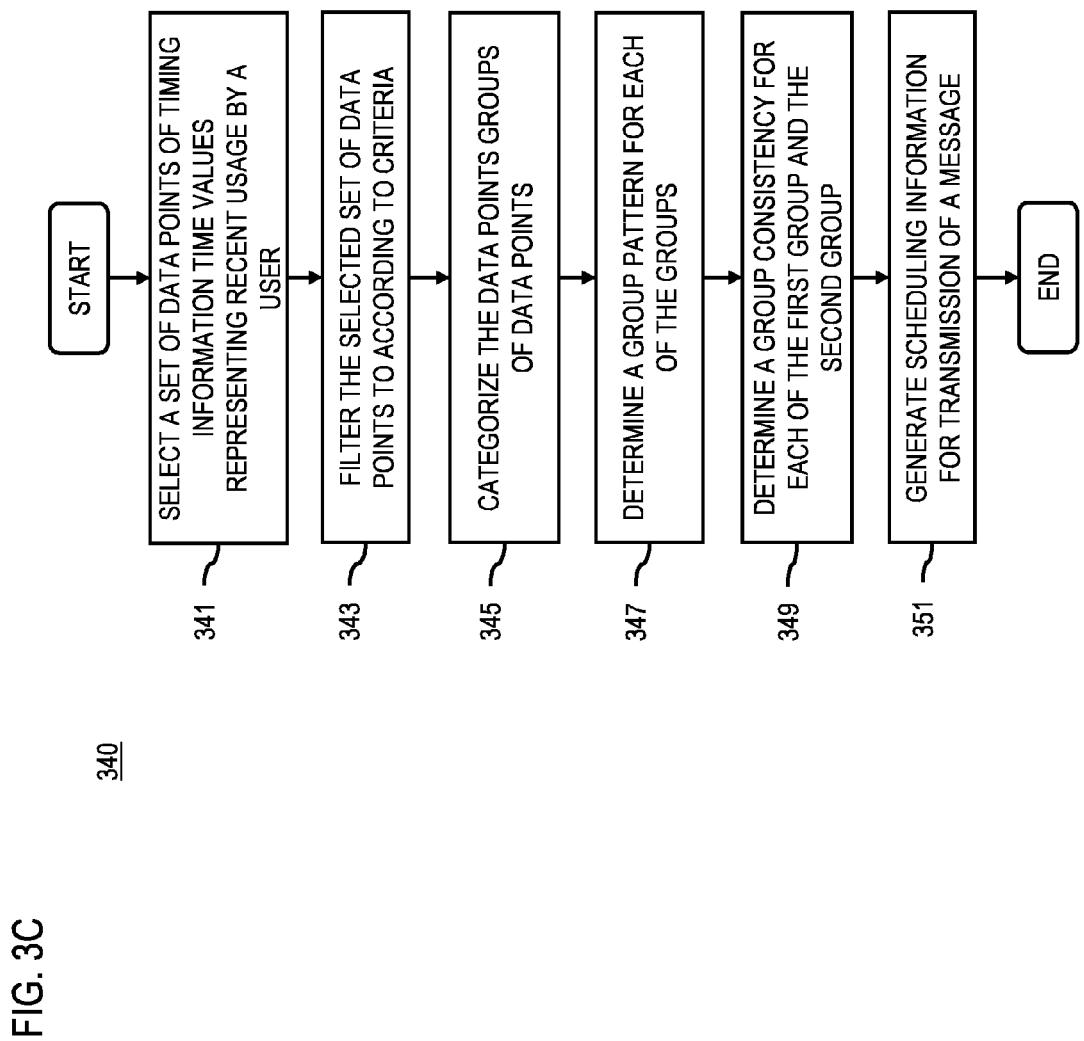

FIG. 3C is a flowchart of a process 340 for determining and scheduling appropriate times to send messages to users, according to one embodiment. In one embodiment, the runtime module 207 performs the process 340 and is implemented in, for instance, a chip set including a processor and a memory as shown FIG. 6 and/or using a computer system of FIG. 5. The runtime module 207 can receive a request from an online service for scheduling information or to schedule and initiate transmission of a message to a user. The runtime module 207 can then retrieve user timing information from a user information database 109 to determine an appropriate time to send the message to the user. At step 341, a set of data points representing recent usage by the user is selected by the runtime module 207. The set of data points can be selected based on criteria (e.g., a time frame or a common attribute among the data points). For example, the set of data points may include data points associated with user logins over the past 5 preceding days, the past four preceding weekday days, over the last 3 preceding weekend days, or can be a group of data points representing the user's usage over a period of time (e.g., since registering with the online service 103).

In one exemplary embodiment, at step 343, the runtime module 207 filters the selected set of data points according to criteria. For example, the data points can be filtered by determining a normal distribution of the data points and filtering any data points outside of a normal distribution threshold. An example of the normal distribution threshold is a standard deviation. If a data point is outside of the standard deviation or a multiple of a standard deviation, the data point can be filtered out of the set of data points used to determine the pattern of consistent usage.

In one embodiment, at step 345, the data points (filtered or unfiltered) can be categorized by the runtime module 207 into a first group of data points and a second group of data points. More than two groups of data points can be used. Additionally, in some embodiments, the data points need not be segregated into groups. The categorization can be based on a time of day, a day of week, holiday days, weekday days, weekend days, other criteria that can represent lifestyle choices of the user, or a combination thereof. For example, the first group of data points can represent timing information about the user when the user is using the online service 103 during weekday days. Additionally, the second group of data points can represent timing information about the user using the online service 103 during weekend days. Differences in a user's usage patterns of the online service 103 can be seen between a grouping of weekday data points and a grouping of weekend data points. For example, on weekday days, the user might use the online service 103 between the hours of 6 PM EST (Eastern Standard Time) and 8 PM EST. The user may use the online service 103 between the hours of 1 PM EST and 4 PM EST during the weekend days. It would thus be appropriate to send a message to the user between 6 PM EST and 8 PM EST on weekday days, but between 1 PM EST and 4 PM EST on weekend days. Under some scenarios, holidays can be associated with the weekend grouping. Weekday and weekend groupings are only one example, other user lifestyle observations can be deciphered using long-term timing information. For example, a category can be created based on long-term timing information by recognizing usage patterns (e.g., a three day use between 5 PM EST and 8 PM EST followed by a four day use between 2 PM EST and 4 PM EST) over a historical time.

In another embodiment, at step 347, a group pattern for each of the first group and the second group is determined by the runtime module 207. A group pattern can be determined for each group based on a set of pattern rules. The pattern rules can be based on data points within certain time windows over a period of time. An example of a pattern rule is that a pattern is generated if a set of data points in the group is within a time window for a certain number of consecutive days. A time window could be used to find ranges of times where the user has been using the online service 103. For example, the rule could be set so that two hour windows are looked at. Under one scenario, the runtime module 207 determines that for the first group there are two patterns, a pattern over two days for a two hour time window starting at 7 AM EST and ending at 9 AM EST and another pattern between 7 PM EST and 9 PM EST. Data points included in the first group could include a 7 AM EST usage, an 8 AM EST usage, an 8:30 AM EST usage, a 7 PM EST usage, and a 9 PM EST usage. The same pattern rule or other pattern rules can be used to determine a group pattern for each of the groups.

In a further embodiment, at step 349, the runtime module 207 determines a group consistency for each of the first group and the second group. The group consistency can be determined based on a consistency rule. A consistency rule can be based on the lack of variance in data point time values over a period of time. An exemplary consistency rule may require that a pattern is consistent (e.g., within a certain tolerance range or time window) over at least three consecutive usage days of the group. Another exemplary consistency rule may require that a pattern be consistent over at least three out of the four user usages within the group. In another example, the consistency rule can output a how many days of recent use the user used the service within a time window and output how many days were outside of the time window. Additionally, the runtime module 207 can determine a consistency level of a data pattern. The consistency level can be determined by statistics based on a correlation of historical data in combination with the recent usage pattern. Further, the consistency level can be greater (e.g., more accurate) with more consistent data. The consistency rules can be applied to timing information to determine if the data points used to form group patterns are consistent.

Then, at step 351, the runtime module 207 generates scheduling information for transmission of the message based on a determined pattern and/or the consistency of the pattern, according to yet another embodiment. The determined pattern can include one or more group patterns or other patterns. The scheduling information can also be determined based on the group consistency of any of the group patterns. Appropriate times to initiate transmission of the message can be determined based on the group patterns based on a set of rules. For example, the message can be scheduled during a time period associated with one of the group patterns. In one example, if the group pattern indicates that the user uses the service between 7 PM and 9 PM on weekdays, the scheduling information can indicate that the message should be sent sometime between 7 PM and 9 PM on the next weekday. Additionally, the scheduling information can be based on the consistency information. For example, if the group patterns are inconsistent, the runtime module 207 can determine that the scheduling information should not reflect the inconsistent group patterns. Further, if more than one group pattern is consistent and available, the runtime module 207 can select which group pattern to utilize to schedule the transmission of the message based on criteria. One such criterion would be to select whichever pattern yields the soonest transmission. Another such criterion would be to select whichever pattern has the highest consistency level. The higher the consistency level, the greater the chance to send the message at an appropriate time.

According to the above approach, the online service 103 is able to send instant messages to users in a coordinated, adaptive manner. The online service 103 improves service quality to the user by adapting the sending of instant messages to usage of the online service 103 by the user. In this manner, users can travel or move to different time zones and receive instant messages at a time adapted to the lifestyle of the user.

FIG. 4 is a graph displaying an exemplary representation of timing information for use in determining an appropriate schedule for message delivery, according to one embodiment. In graph 400, data point 401 represents the time of registration by the user to the online service 103. Sets of data points 403, 405, 407 represent the login times of the user on the corresponding days. The graph 400 has been simplified to show a single data point for each day, however, it is contemplated that multiple sets of data points can be saved in a single day. In this example, the y-axis represents the time of day of a user login based on Coordinated Universal Time. Other time zones or timekeeping mechanism can also be used. In this exemplary embodiment, the timing information includes user login information from 00:00 UTC to 24:00 UTC daily. The x-axis represents the date. According to this example, the eighteen days, starting from the day of the user registering for an online service 103 are displayed.

Under one scenario, the online service 103 may desire to send a message (e.g., an instant message) to the registered user on day 8. The online service 103 can send a request to the online service tracking platform 102 to determine scheduling information to send the message at an appropriate time. The registration data point 401 and data points 403 represent the timing information available to make a decision regarding what time to send the message on day 8. Because the data points 401 and 403 encompass a window between 16:00 UTC (Coordinated Universal Time) and 20:00 UTC, the most appropriate time to send the message is within that timing window. In one example, a pattern rule can include averaging data points to determine the appropriate time to send a message if the data points are within a 4 hour timing window. Thus, 18:00 UTC is the appropriate time to send the instant message and the message can be scheduled to be sent at that time.

Under another scenario, the online service 103 may determine a need to send a message to the registered user on day 12. The registration data point 401, data points 403 and data points 405 are timing information available to determine what time to send the message. More recent data points 405 can be used to determine that a more appropriate time to send the message to the user on day 12 is 04:00 UTC rather than the appropriate time of 18:00 UTC on day 8. The 04:00 UTC time can be determined based on a pattern of data points 405 because these data points 405 are more recent than the data points 403 used to determine the appropriate time to send the message on day 8 and these data points 405 meet the pattern rule. The change in the timing information can represent a change in the time zone of the user or a change in the lifestyle of the user.

Additionally, the online service 103 can determine whether to send the day 12 message based on the consistency of the data points. In one example, the online service 103 can have a consistency rule that three or more days worth of consistent data points are needed to make a decision. In this example, the more recent data points 405 meet this rule and therefore, the message can be scheduled to be sent at 04:00 UTC on day 12. In another example, 4 days of consistent data points are needed to conform with the consistency rule. The three data points 405 thus fulfill the rule and the message sending can be postponed until more consistent data is present. Later, at day 18, more information is available. Data points 407 meet the pattern rule and the consistency rule on day 18 to send the message on day 18 at 16:30 UTC. This could represent the user returning to the original time zone or lifestyle of the user. Additionally, the time pattern rule and/or the consistency rule can take into account the historical use of the user to utilize former patterns in making a decision. For example, data points 403 and data points 407 can be used to determine the appropriate time of 17:15 UTC instead of 16:30 UTC based on the averaging rule using data points 403 and 407. Data points 405 can be filtered out of the data points 403, 407 because data points 405 may be determined to be inconsistent with the most recent information about the user.

The above processes for determining a schedule for appropriate times to communicate with users based on online service usage behavior can advantageously make delivery of the messages pertaining to products and services of online services more effective. Also, network resources can be efficiently employed, but minimizing or avoiding delivery of messages when it is likely to be ignored by the end users.

The processes described herein for determining appropriate times for an online service 103 to send instant messages may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

According to certain embodiments, the described processes of FIGS. 3A-3C are performed on the network-side (or server side)—e.g., via online service tracking platform 102 of FIG. 1. Additionally or alternatively, these processes can be executed on the terminal side (or client side).

Figure 5:
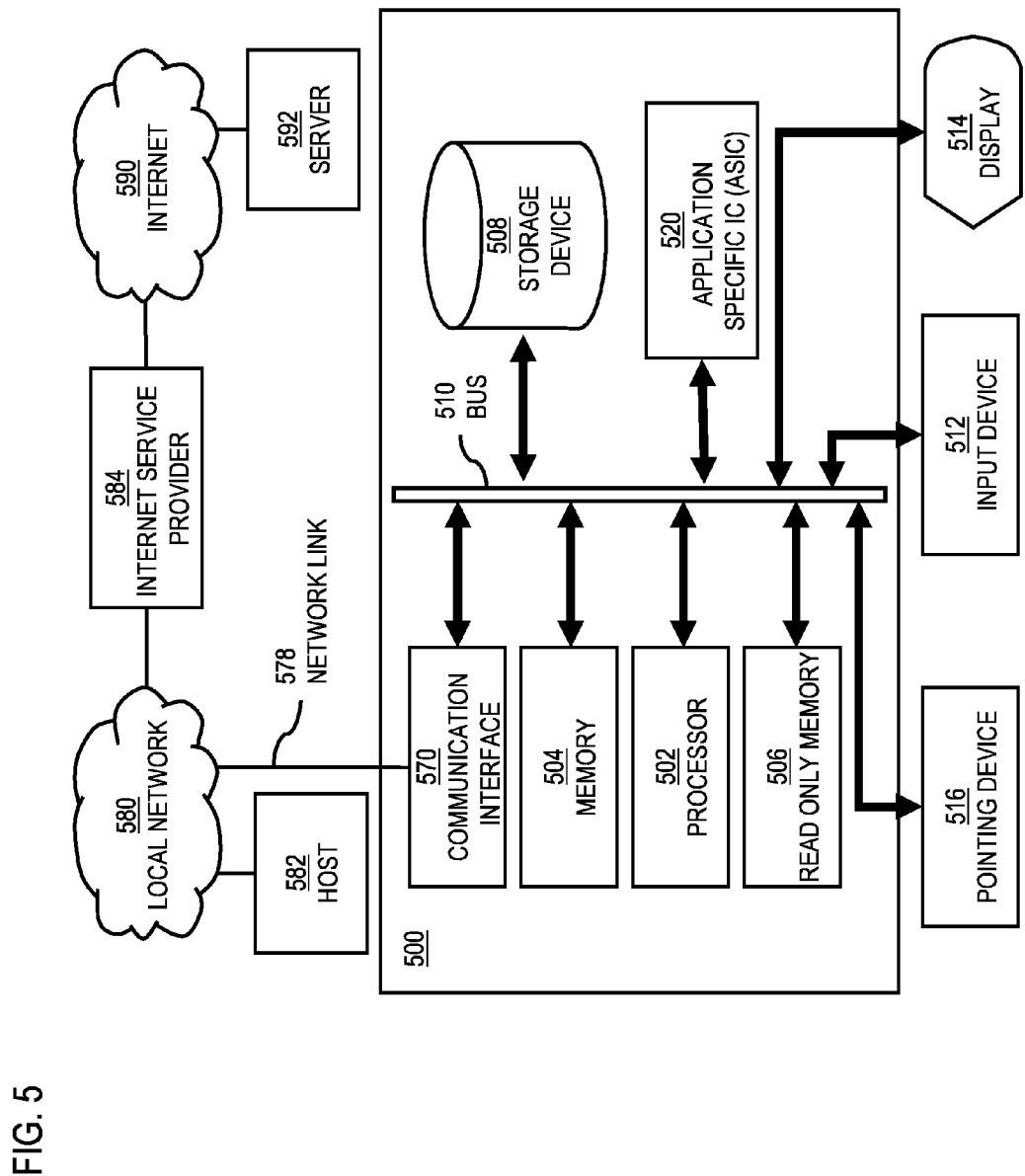
FIG. 5 is a diagram of hardware configured for a service solution that can be used to implement an embodiment of the invention.

FIG. 5 is a diagram of hardware configured for a service solution that can be used to implement an embodiment of the invention. Additionally, FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to determine appropriate times for the online service 103 to send instant messages as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of determining appropriate times for an online service 103 to send instant messages.

A bus 510 includes one or more parallel conductors of information so that information is transferred quickly among devices coupled to the bus 510. One or more processors 502 for processing information are coupled with the bus 510.

A processor 502 performs a set of operations on information as specified by computer program code related to determining appropriate times for the online service 103 or an online service tracking platform 102 to send instant messages. The computer program code is a set of instructions or statements providing instructions for the operation of the processor and/or the computer system 500 to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or other dynamic storage device, stores information including processor instructions for determining appropriate times for an online service 103 or an online service tracking platform 102 to send instant messages. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for determining appropriate times for an online service 103 or online service tracking platform 102 to send instant messages, is provided to the bus 510 for use by the processor from an optional external input device 512, such as a keyboard containing alphanumeric keys operated by a human user, or a sensor. A sensor detects conditions in its vicinity and transforms those detections into physical expression compatible with the measurable phenomenon used to represent information in computer system 500. Other optional external devices coupled to bus 510, used primarily for interacting with humans, may include a display device 514, such as a cathode ray tube (CRT) or a liquid crystal display (LCD), or plasma screen or printer for presenting text or images, and a pointing device 516, such as a mouse or a trackball or cursor direction keys, or motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for an online service 103 or online service tracking platform 102 to send instant messages to the UE 101.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592. As such, the server 592 can be used to implement the processes of certain embodiments.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

Figure 6:
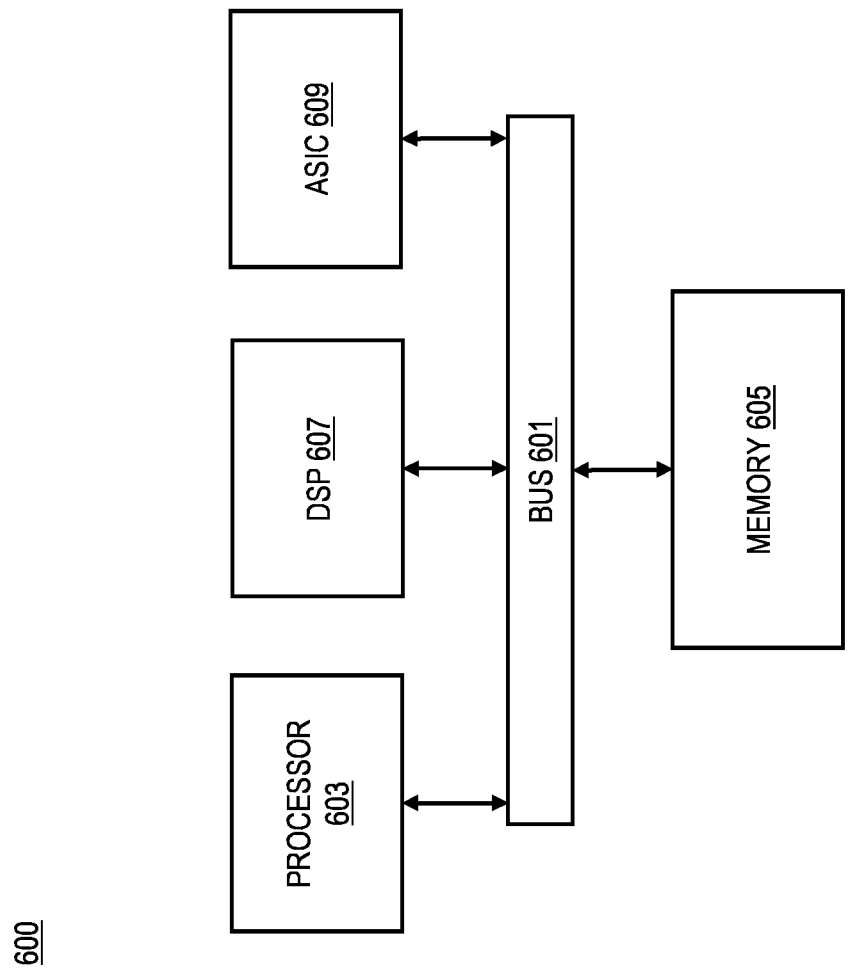
FIG. 6 is a diagram of a chip set that can be used to implement an embodiment of the invention.

FIG. 6 illustrates a chip set 600 upon which an embodiment of the invention may be implemented. Chip set 600 is programmed to determine appropriate times for an online service 103 or online service tracking platform 102 to send instant messages as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of determining appropriate times for an online service 103 or online service tracking platform 102 to send instant messages.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to determine appropriate times for an online service 103 or an online service tracking platform 102 to send instant messages. The memory 605 also stores the data associated with or generated by the execution of the inventive steps.

Figure 7:
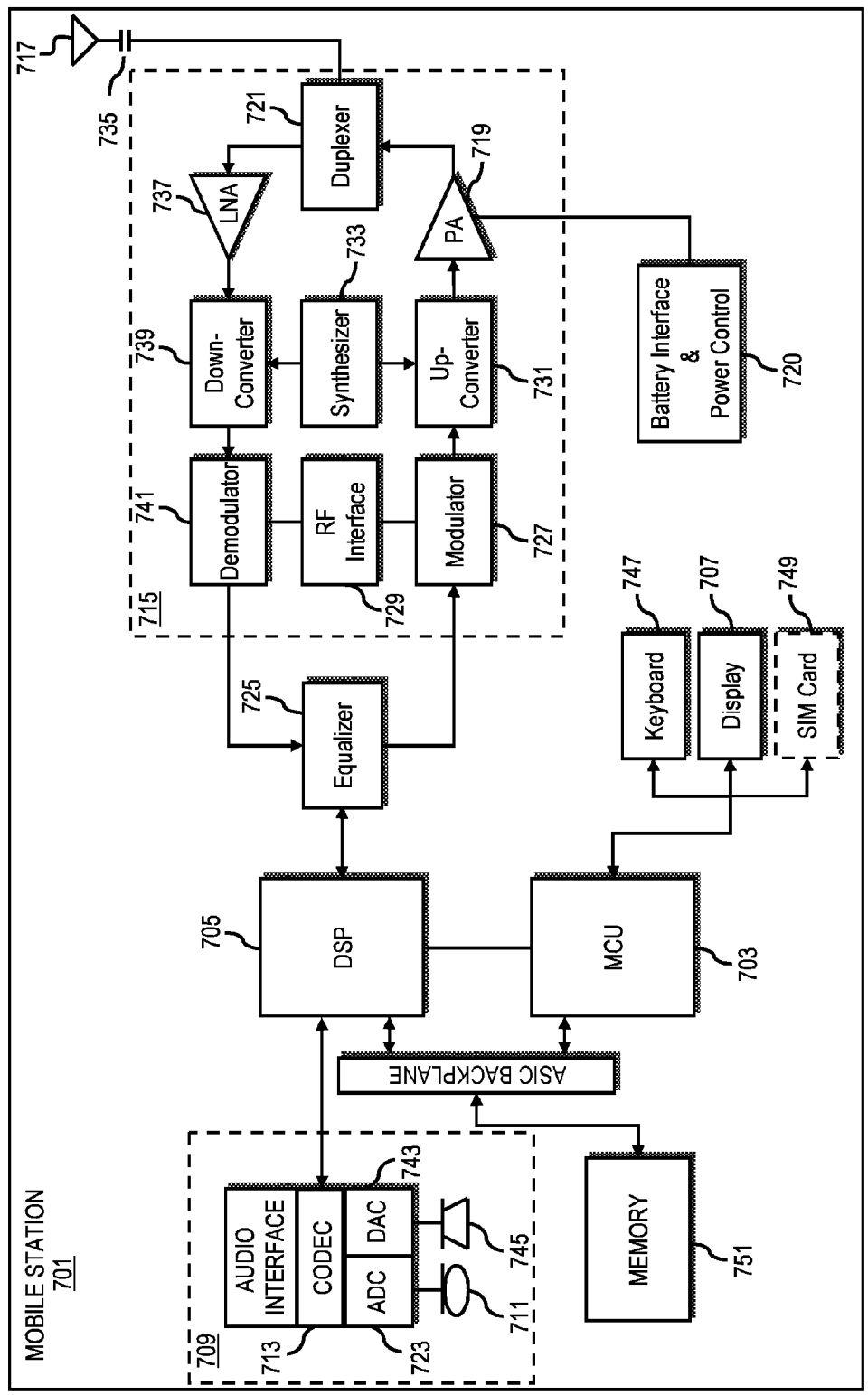
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 700, or a portion thereof, constitutes a means for performing one or more steps of utilizing an online service 103 and receiving instant messages from the online service 103 or online service tracking platform 102 at appropriate times. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application, the term "circuitry" would also cover an implementation of merely a processor (or multiple processors) and its (or their) accompanying software/or firmware. The term "circuitry" would also cover, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of displaying messages received from the online service 103 or the online service tracking platform 102 at appropriate times. The display unit 707 includes display circuitry configured to display at least a portion of a user interface of the mobile terminal (e.g., mobile telephone). Additionally, the display unit 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703—which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to use an online service 103 and receive instant messages from an online service 103 or online service tracking platform 102. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving a request from at least one of one or more online services to transmit a message to a user of the one or more online services;
   collecting timing information relating to usage by the user from a platform configured to provide the one or more online services, wherein the timing information is associated with a login of the user with one of the one or more online services;
   determining, by a processor, a pattern of consistent usage from the timing information, wherein the pattern reflects usage of at least one of the one or more online services and transmission availability of a message; and
   generating scheduling information for transmission of the message to the user, based on the determined pattern of consistent usage and a consistency of the determined pattern of consistent usage, wherein the message is associated with the one or more online services.

2. A method of claim 1, wherein the timing information comprises data points of time values, the method further comprising:
   selecting a set of the data points representing recent usage by the user; and
   filtering the selected set of data points according to criteria,
   wherein the pattern is determined at least in part based on the filtered set of data points.

3. A method of claim 1, wherein the timing information comprises data points of time values, the method further comprising:
   categorizing the data points into a first group of data points and a second group of data points; and
   determining a group pattern for each of the first group and the second group,
   wherein the scheduling information is based on the group patterns.

4. A method of claim 3, further comprising:
   determining a group consistency for each of the first group and the second group, wherein the scheduling information is further based on the group consistencies;
   scheduling a time to initiate transmission of the message corresponding to the scheduling information; and
   initiating transmission of the message based on the scheduled time to a user equipment of the user.

5. An apparatus comprising:
   at least one processor; and
   at least one memory including computer program code,
   the at least one memory and the computer program code configured to, with the at least one processor, cause the apparatus to perform at least the following,
      receive a request from at least one of one or more online services to transmit a message to a user of the one or more online services;
      collect timing information relating to usage by the user from a platform configured to provide the one or more online services, wherein the timing information is associated with a login of the user with one of the one or more online services;
      determine a pattern of consistent usage from the timing information, wherein the pattern reflects usage of at least one of the one or more online services and transmission availability of a message; and
      generate scheduling information for transmission of the message to the user, based on the determined pattern of consistent usage and a consistency of the determined pattern of consistent usage, wherein the message is associated with one or more online services.

6. An apparatus of claim 5, wherein the timing information comprises data points of time values, and wherein the apparatus is further caused to:
   select a set of the data points representing recent usage by the user; and filter the selected set of data points according to criteria,
   wherein the pattern is determined at least in part based on the filtered set of data points.

7. An apparatus of claim 5, wherein the timing information comprises data points of time values, and wherein the apparatus is further caused to:
   categorize the data points into a first group of data points and a second group of data points; and
   determine a group pattern for each of the first group and the second group, wherein the scheduling information is based on the group patterns.

8. An apparatus of claim 5, wherein the apparatus is further caused to:
   determine a group consistency for each of the first group and the second group, wherein the scheduling information is further based on the group consistencies;
   schedule a time to initiate transmission of the message corresponding to the scheduling information; and
   initiate transmission of the message based on the scheduled time to a user equipment of the user.

* * * * *